United States Patent
Hubner et al.

(10) Patent No.: US 10,257,973 B2
(45) Date of Patent: Apr. 16, 2019

(54) ROW PLANTER UNIT WITH SENSOR-MOUNTED FURROW SHAPER

(71) Applicant: Deere & Company, Moline, IL (US)

(72) Inventors: Cary S. Hubner, Geneseo, IL (US);
Elijah B. Garner, Bettendorf, IA (US);
Kamalakannan Natarajan, Pune (IN)

(73) Assignee: Deere & Company, Moline, IL (US)

( * ) Notice: Subject to any disclaimer, the term of this patent is extended or adjusted under 35 U.S.C. 154(b) by 6 days.

(21) Appl. No.: 15/432,435

(22) Filed: Feb. 14, 2017

(65) Prior Publication Data

US 2018/0228078 A1  Aug. 16, 2018

(51) Int. Cl.
*A01C 5/06* (2006.01)
*A01C 7/20* (2006.01)

(52) U.S. Cl.
CPC .............. *A01C 5/062* (2013.01); *A01C 7/203* (2013.01)

(58) Field of Classification Search
CPC .. A01C 5/062; A01C 5/06; A01C 5/00; A01C 5/068; A01C 5/066; A01C 7/203; A01C 7/201; A01C 7/20; A01C 7/00
See application file for complete search history.

(56) References Cited

U.S. PATENT DOCUMENTS

| | | | |
|---|---|---|---|
| 2,142,454 | A | 1/1939 | Needham |
| 3,380,411 | A | 4/1968 | Orendorff |
| 4,598,654 | A | 8/1986 | Robertson |
| 2002/0131046 | A1 | 9/2002 | Christy |
| 2011/0192331 | A1 | 8/2011 | Bergere |
| 2014/0153157 | A1 | 6/2014 | Masuda |
| 2017/0049044 | A1 | 2/2017 | Stoller et al. |
| 2017/0094889 | A1* | 4/2017 | Garner ............ A01B 76/00 |

FOREIGN PATENT DOCUMENTS

| | | |
|---|---|---|
| CA | 2989309 A1 | 12/2016 |
| CN | 107360762 A | 11/2017 |
| EP | 3150045 A1 | 4/2017 |
| WO | 2013049198 A1 | 4/2013 |
| WO | 20140153157 A1 | 9/2014 |
| WO | 2015031840 A1 | 3/2015 |
| WO | 2015171908 A1 | 11/2015 |
| WO | 20150171915 | 11/2015 |
| WO | 2016077651 A1 | 5/2016 |
| WO | 2016205422 A1 | 12/2016 |
| WO | 2017049186 A1 | 3/2017 |
| WO | 2017112892 A1 | 6/2017 |
| WO | 2017197274 A1 | 11/2017 |
| WO | 2018013860 A2 | 1/2018 |
| WO | 2018013861 A1 | 1/2018 |
| WO | 2018018050 A1 | 1/2018 |

OTHER PUBLICATIONS

EP Application No. 18151092 Extended European Search Report and EP Search Opinion dated Sep. 3, 2018, 9 pages.
US Prosecution History for U.S. Appl. No. 13/023,277, filed Feb. 8, 2011, 97 pages.

* cited by examiner

*Primary Examiner* — Christopher J. Novosad
(74) *Attorney, Agent, or Firm* — Joseph R. Kelly; Kelly, Holt & Christenson PLLC

(57) ABSTRACT

A planter row unit comprises a frame, a furrow opener mounted to the frame to open a furrow, a seed delivery mechanism mounted to the frame to deposit seed into the furrow, a furrow shaper, and a sensor configured to detect a parameter related to seed planting.

18 Claims, 8 Drawing Sheets

FIG. 3

ROW PLANTER UNIT WITH SENSOR-MOUNTED FURROW SHAPER

FIELD OF THE DISCLOSURE

The present disclosure relates to a planter row unit, and more particularly to a planter row unit with a furrow shaper.

BACKGROUND OF THE DISCLOSURE

A planter typically has several planter row units. Each planter row unit is configured to plant seed in the ground as the planter is pulled or otherwise moved in a planting direction of travel. The row unit has a furrow opener to open a furrow, a furrow closer to close the furrow, and a seed delivery mechanism to deposit seed into the furrow before it is closed. It is also known for a row unit to have a furrow shaper to shape the furrow ahead of deposition of seed into the furrow relative to the planting direction of travel. The furrow opener sometimes forms the furrow with a W-shaped cross-section lateral to the planting direction of travel. The furrow shaper comes along behind the furrow opener to shape the furrow without the middle peak of the W shape to prepare the furrow for reception of seed.

SUMMARY OF THE DISCLOSURE

According to an aspect of the present disclosure, a planter row unit comprises a frame, a furrow opener mounted to the frame to open a furrow, a seed delivery mechanism mounted to the frame to deposit seed into the furrow, a furrow shaper mounted to the frame and positioned relative to the furrow opener and the seed delivery mechanism to shape the furrow, opened by the furrow opener, ahead of seed deposited into the furrow by the seed delivery mechanism relative to a planting direction of travel of the planter row unit, and a sensor mounted to the furrow shaper and configured to detect a parameter related to seed planting.

The above and other features will become apparent from the following description and accompanying drawings.

BRIEF DESCRIPTION OF THE DRAWINGS

The detailed description of the drawings refers to the accompanying figures in which.

DETAILED DESCRIPTION OF THE DRAWINGS

Figure 1:
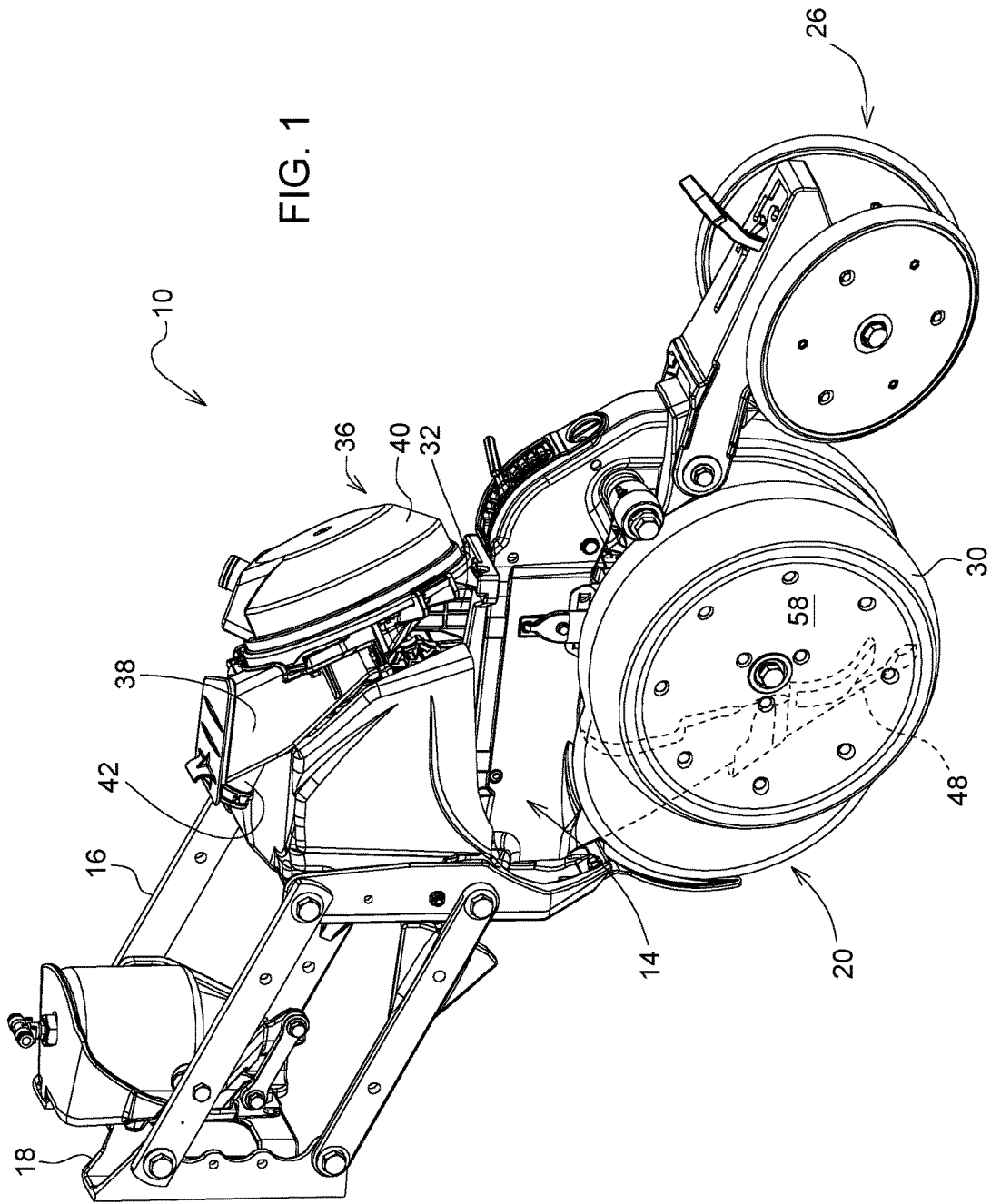
FIG. 1 is a perspective view showing a planter row unit with a furrow shaper (in phantom)
Figure 2:
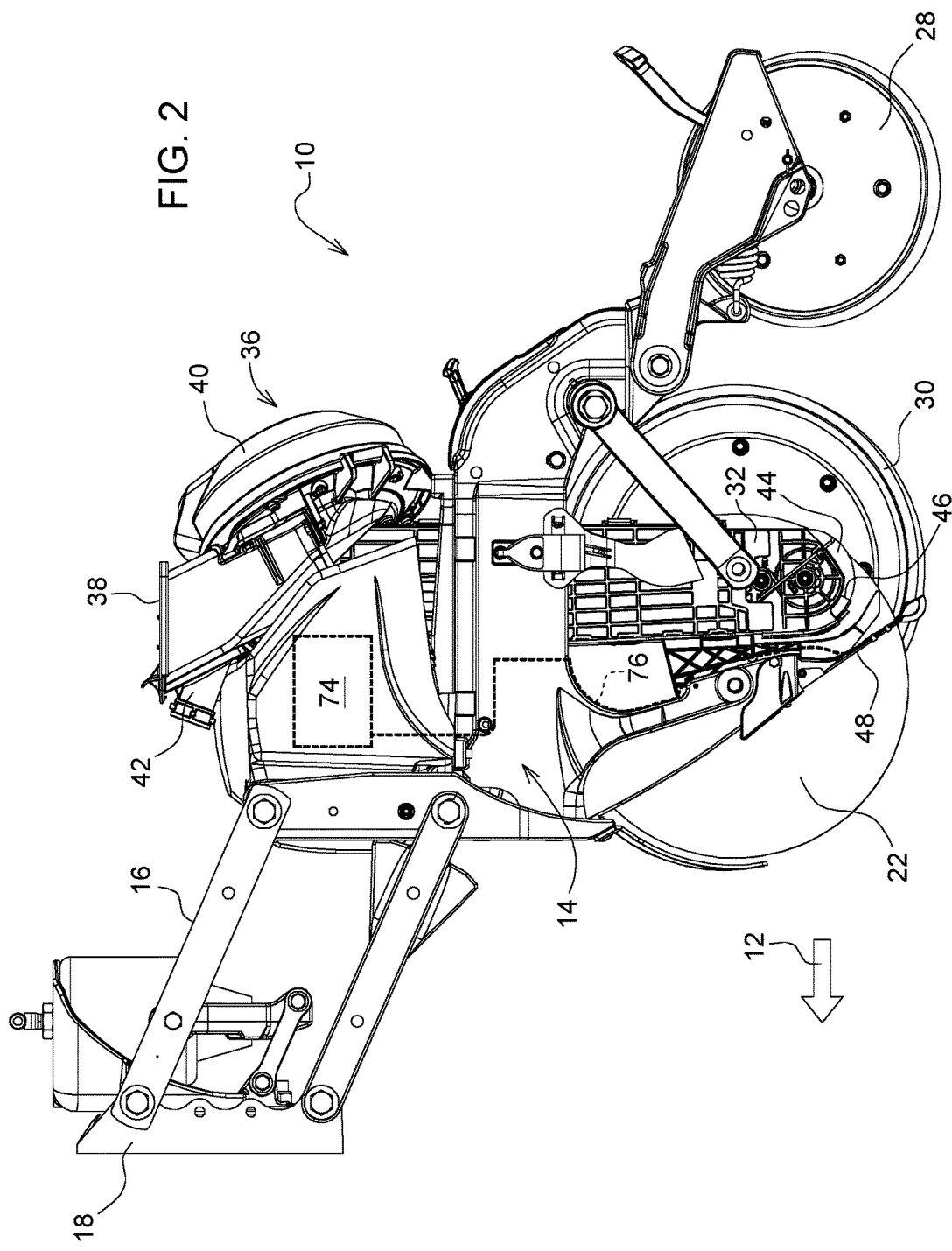
FIG. 2 is a side elevational view, with portions broken away, showing the planter row unit.

Referring to FIGS. 1 and 2, a planter row unit 10 may be used in a planter having a number of such row units mounted to a toolbar of the planter. Each row unit 10 is configured to plant seeds in the ground, as the planter is moved in a planting direction of travel 12 through a field by, for example, a tractor.

The row unit 10 comprises a frame 14 and a four-bar linkage 16 that mounts the frame 14 to the toolbar. The linkage 16 comprises a bracket 18 bolted to the toolbar.

The row unit 10 comprises a furrow opener 20 mounted to the frame 14 to open a furrow in the ground. The furrow opener 20 may comprise two discs 24, one of which is shown, for example, in FIG. 2, positioned relative to one another to open the furrow.

The row unit 10 comprises a furrow closer 26 mounted to the frame 14 to close the furrow. The furrow closer 26 is positioned rearwardly of the furrow opener 20 relative to the planting direction of travel 12 of the row unit 10. The furrow closer 26 may comprise two closing wheels 28 positioned relative to one another to close the furrow.

The row unit 10 comprises two gauge wheels 30 mounted to and positioned on opposite sides of the frame 14. The gauge wheels 30 cooperate to establish the depth of the furrow opener 20 and correspondingly the depth of the furrow. The gauge wheels 30 are vertically movable relative to the frame 14 to a stop which sets the furrow depth.

The row unit 10 comprises a seed delivery mechanism 32 mounted to the frame 14 to deposit seed into the furrow. The seed delivery mechanism 32 is positioned between the furrow opener 20 and the furrow closer 26 relative to a planting direction of travel 12 of the row unit 10

The seed delivery mechanism 32 is included in a seed supply system 36 of the row unit 10. Illustratively, the seed supply system 36 comprises a hopper 38 and a vacuum seed meter 40. The hopper 38 is configured to receive seed from a source (not shown) via a hopper inlet 42. The seed meter 40 is configured to receive seed from the hopper 38, and singulate the seed on respective apertures (not shown) of the meter 40 to which a vacuum pressure is applied.

Illustratively, the seed delivery mechanism 32 is configured as a brush-belt cartridge. The brush-belt cartridge comprises a brush belt 44 (shown diagrammatically) circulating to pick up seed one-by-one from the seed meter 40 and to deliver the seed to a seed outlet 46 of the mechanism 32 where the brush belt 44 releases the seed, which is under centrifugal force as the brush belt 44 makes a turn near the bottom of its cycle. The mechanism 32 is configured to deposit each seed into the furrow. Other seed delivery mechanisms may be used to deposit seed into the furrow, such as, for example, a seed tube.

The row unit 10 comprises a furrow shaper 48 mounted to the frame 14. The furrow shaper 48 is positioned relative to the furrow opener 20 and the seed delivery mechanism 32 to shape the furrow, opened by the furrow opener 20, ahead of seed deposited into the furrow by the seed delivery mechanism 32 relative to the planting direction of travel 12 of the planter row unit 10. Illustratively, the furrow shaper 48 is positioned at least in part between the furrow opener 20 and the seed delivery mechanism 32 relative to the planting direction of travel 12.

When the furrow opener 20 opens the furrow, it may form the furrow with a W-shaped cross-section lateral to the planting direction of travel 12, in which case the seed may fall to one side or the other of the furrow in a somewhat uncontrolled manner. The furrow shaper 48 is configured to shape the bottom of the furrow such that the bottom of the furrow has a generally V-shaped lateral cross-section, so as to position the seed in the vertex of the V shape. Alternatively, the furrow shaper 48 may be configured to shape the bottom of the furrow so as to have a U-shaped lateral cross-section, or other suitable shape.

Figure 3:
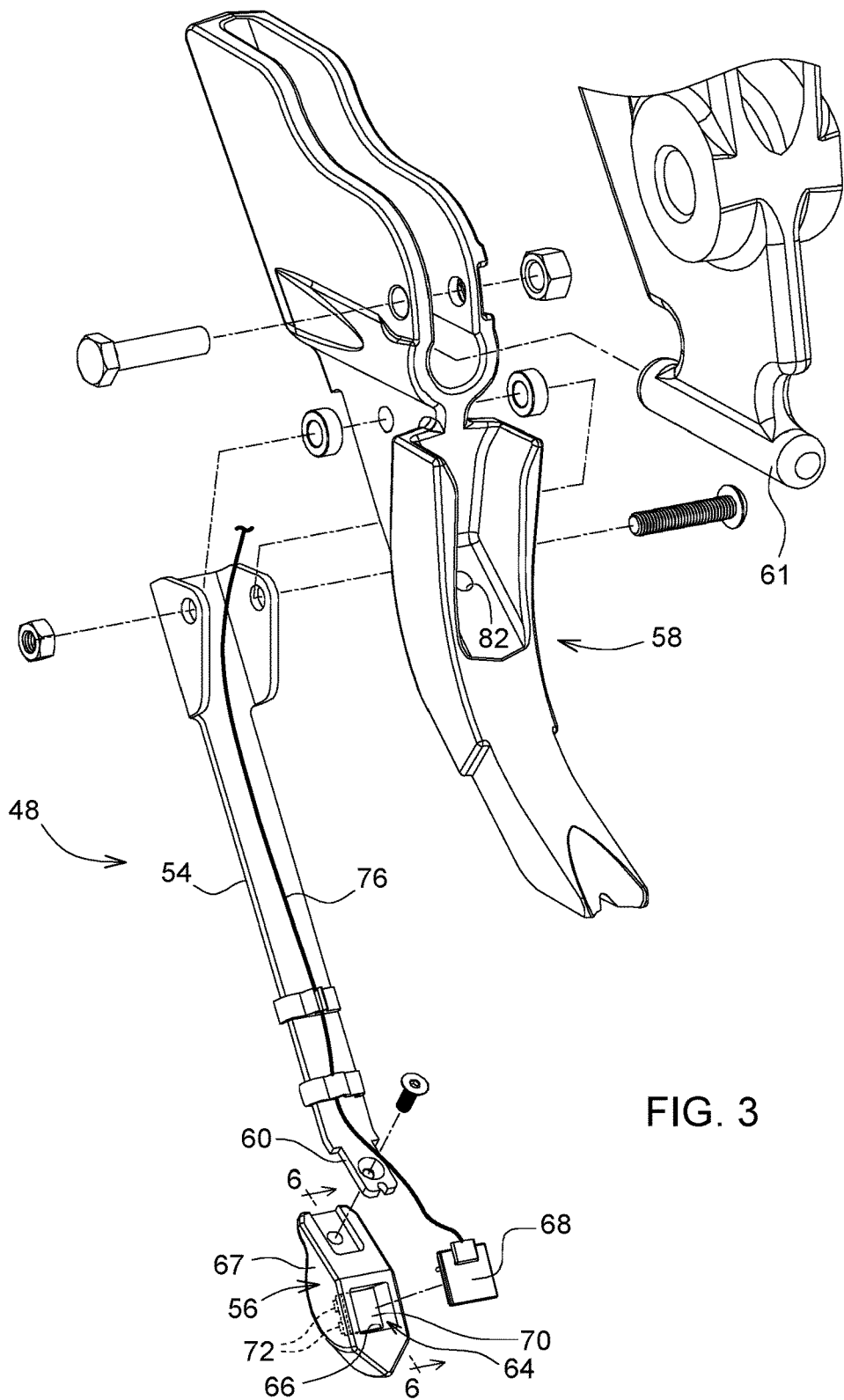
FIG. 3 is an exploded perspective showing the furrow shaper, a guard of a frame of the row unit to which the furrow shaper is to be mounted, and a shank of the frame to which the guard is to be mounted.
Figure 4:
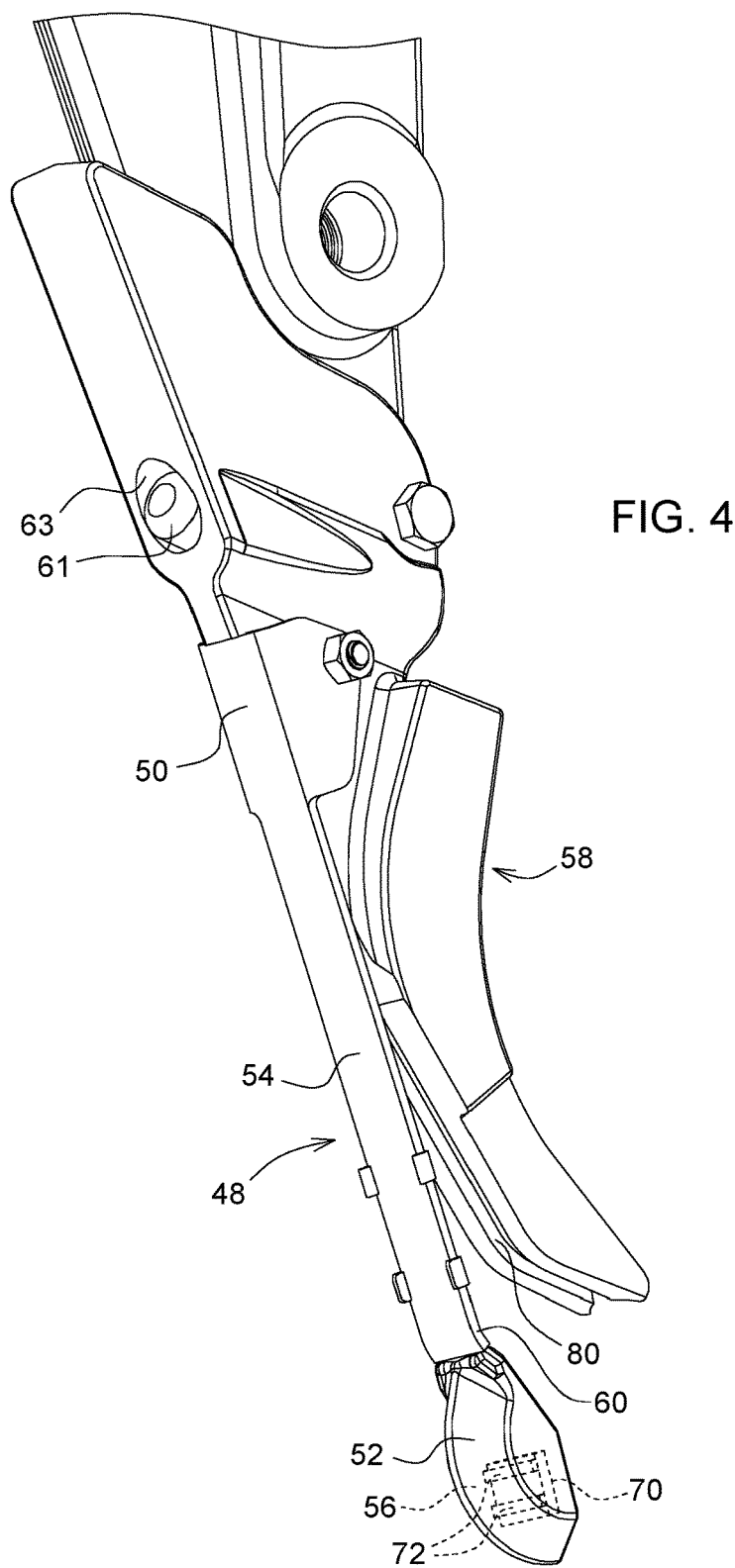
FIG. 4 is a perspective view showing the furrow shaper mounted to the guard.
Figure 5:
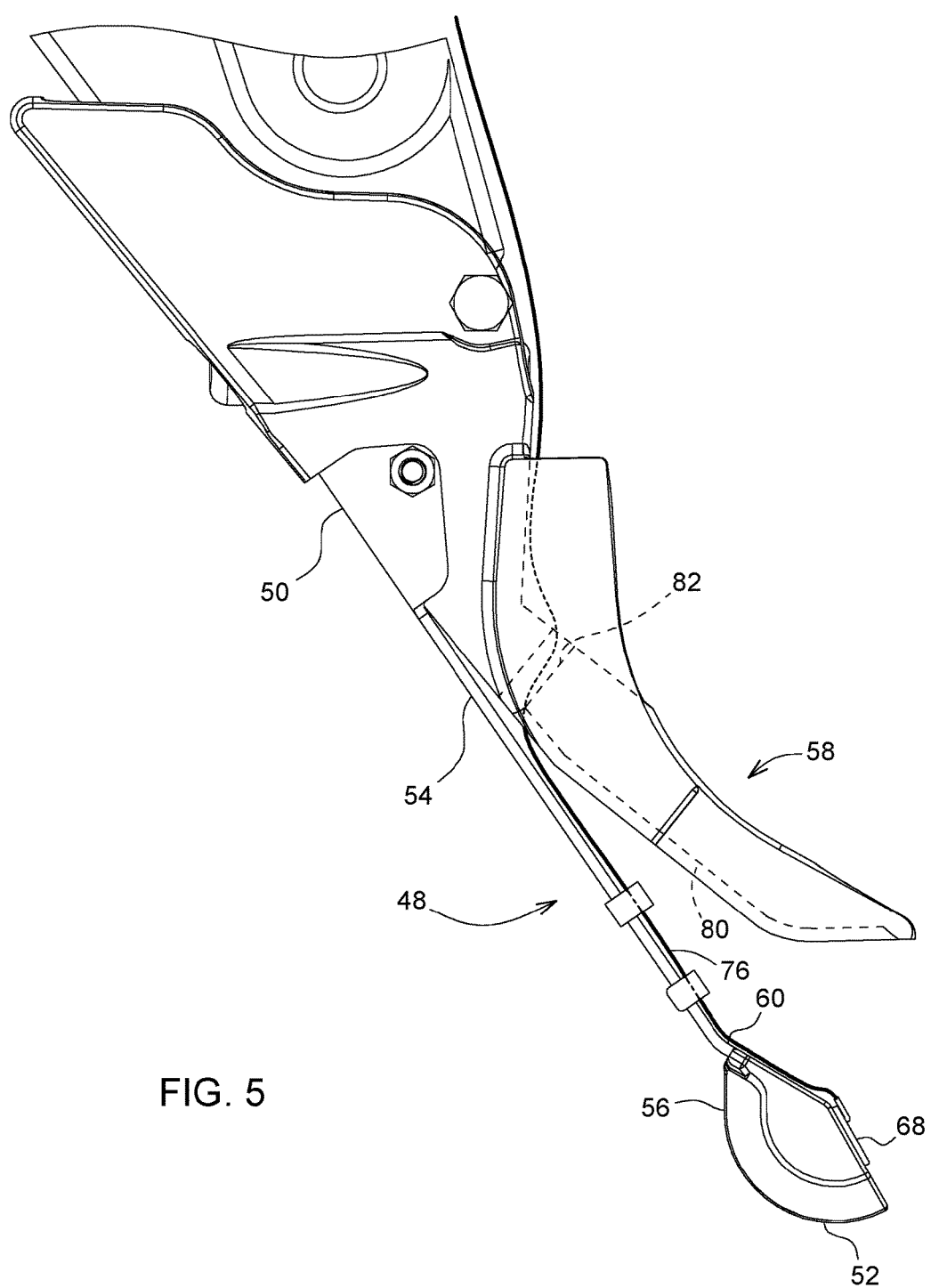
FIG. 5 is a side elevational view showing the guard with a groove (dashed) positioned to receive wiring routed along a leg of the furrow shaper upon deflection of the leg.

Referring to FIGS. 3-5, the furrow shaper 48 comprises a proximal end 50 and a distal end 52. The proximal end 50 is mounted to the frame 14. The distal end 52 is configured to form the furrow, for example, with the V shape.

The furrow shaper 48 comprises a leg 54 and a foot 56 profiled to shape the furrow. The leg 54 provides the proximal end 50 of the furrow shaper 48, which is also the proximal end of the leg 54. The proximal end 50 comprises a pair of flanges, the flanges being positioned on either side of a guard 58 of the frame 14. The flanges are fixed to the guard 58 (e.g., bolted with a bolt, a nut, a washer positioned on one side of the guard 58, and another washer positioned on the opposite side of the guard 58). The leg 54 projects downwardly to position the foot 56 in the furrow.

The foot 56 provides the distal end 52 of the furrow shaper 48, and is mounted to a distal end 60 of the leg 54 (e.g., with a screw). The foot 56 is configured to shape the furrow, for example, with the V shape.

The guard 58 is positioned between the furrow shaper 48 and the seed delivery mechanism 32 to shield the seed delivery mechanism 32 from dirt and debris during planting. The guard 58 is a wearable item (made, for example, of metal). It is fixed (e.g., bolted) to a shank 62 of the frame 14 so as to be removable therefrom and replaced upon reaching the end of its service life, in which case the furrow shaper 48 may be removed from the worn guard and mounted to a fresh guard. The bottom of the shank 62 comprises a post 61 received in a post-receiving portion 63 of the guard 58.

The furrow shaper 48 is spring biased downwardly to press against the bottom of the furrow. As such, the furrow shaper 48 is able to maintain contact with the bottom of the furrow despite some variation in the level of the ground or bottom of the furrow.

The leg 50 is spring biased downwardly to press the foot 56 against the bottom of the furrow. The leg 50 may be a flat spring to provide this spring bias.

The row unit 10 comprises a sensor 64 mounted to the furrow shaper 48 and configured to detect a parameter related to seed planting. The sensor 64 may be, for example, a soil sensor. In an embodiment, the parameter is soil moisture, and, in another embodiment, the parameter is soil temperature. In other embodiments, the parameter may be soil type (e.g., clay content) or nutrient content (e.g., nitrogen content) indicative of soil fertility. The sensor 64 may be a capacitive sensor (e.g., for sensing soil capacitance as an indication of soil moisture), a near-infrared sensor, a thermal-imaging sensor, or an optical sensor, to name but a few sensor types. In yet other embodiments, the parameter may be organic matter content or residue presence, in which case the sensor 64 may be an optical sensor (i.e., an electromagnetic spectrum analyzer).

Figure 6:
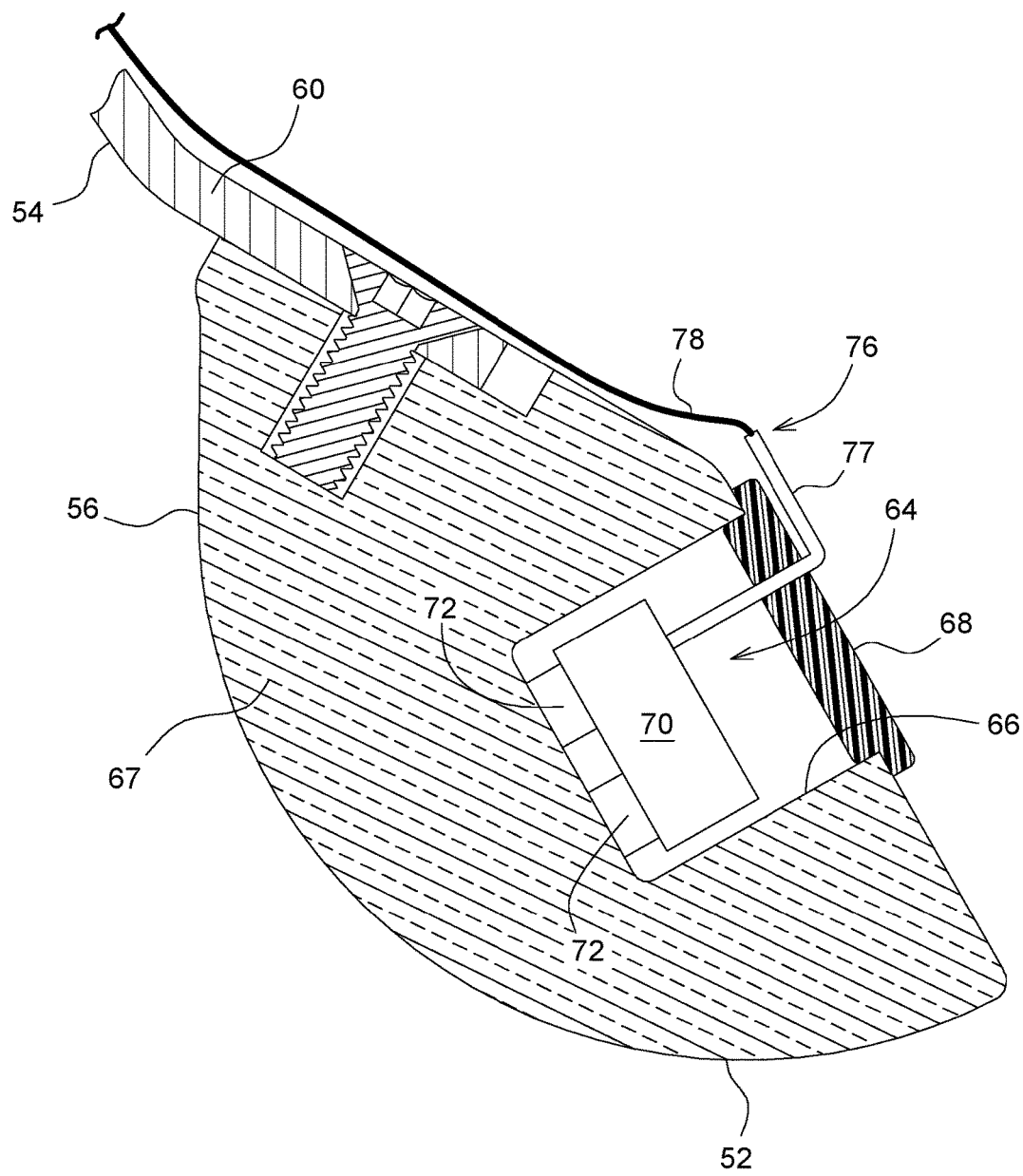
FIG. 6 is an enlarged sectional view, taken along lines 6-6 of FIG. 3, of a foot of the furrow shaper, a sensor enclosed in a cavity of the foot.

Referring to FIGS. 3, 5, and 6, the sensor 64 (shown diagrammatically) is mounted to the foot 56. Illustratively, the sensor 64 is embedded in the foot 56. The foot 56 comprises a cavity 66 included in a body 67 of the foot 56 and in which the sensor 64 is enclosed by the foot 56. The foot 56 comprises a lid 68 closing the cavity 56 so as to enclose the sensor 64 within the cavity 56. The lid 68 is coupled to the body 67, for example, by an adhesive seal around the edge of the lid 68, by fastening the lid 68 to the body 67 (e.g., bolted), or other suitable approach. The lid 68 may be made of a plastic material or other suitable material. The foot 56 comprises a potting material or other permanent molding material generally filling the cavity 66 and holding the sensor 64 in place within the cavity 56.

The sensor 64 comprises a processing unit 70 and a number of electrodes 72 electrically coupled to the processing unit 70. The processing unit 70 may be mounted to a circuit board positioned in the cavity 66. Each electrode 72 may be coupled electrically to the processing unit 70 by a wired connection, a pin, a wireless connection, or other suitable electrical connection. Illustratively, there are two electrodes 72. It is to be understood that the number of electrodes may be more or less than two.

The processing unit 70 and the electrodes 72 are enclosed within the cavity 66 by the foot 56 upon closure of the cavity 66 by the lid 68. The processing unit 70 and the electrodes 72 are embedded in the potting material or other permanent molding material so as to be held in place in the cavity 66.

The sensor 64 is electrically coupled to a controller 74 of the row unit 10 (FIG. 2). The sensor 64 is configured to detect the parameter related to seed planting and to output a signal corresponding to the parameter ("sensor parameter signal") to the controller 74, which may be configured, for example, as a microcontroller or other suitable controller. The processing unit 70 is configured to provide electrical power for operation of the electrodes 72. The electrodes 72 are configured to detect the parameter related to seed planting. The electrodes 72 are configured to do so through the material of the body 67 of the foot 56. Each of the electrodes 72 is configured to generate a signal corresponding to the parameter ("electrode parameter signal"). The processing unit 70 is configured to receive the electrode parameter signals from the electrodes 72, provide signal conditioning, and output the sensor parameter signal, dependent on the electrode parameter signals, to the controller 74.

The body 67 is made, for example, of a wear-resistant and non-conductive material. It is wear-resistant due to its contact with the ground, and non-conductive to facilitate transmission and reception of signals from and to the electrodes 72 through the body 67. The body 67 may be made, for example, of a ceramic material (e.g., a hard ceramic with high wear resistance like Magnesia Stabilized Zirconia material (MSZ)). In other embodiments, the body 67 may be made of ultra-high molecular weight polyethylene (UHMW), or other suitable plastic material.

The controller 74 is mounted to and within the frame 14. The processing unit 70 and the controller 74 are electrically coupled to one another via wiring 76 of the row unit 10 (shown diagrammatically).

The wiring 76 exits the foot 56 through a wiring exit. A sealed connection is established between the wiring 76 and the wiring exit, to block ingress of debris. In the illustrated embodiment, the lid 68 comprises the wiring exit, such that the wiring 76 exits the foot 56 through the wiring exit of the lid 68. In other embodiments, the wiring exit for the wiring 76 may be formed in the body 67.

The wiring 76 may be configured in a wide variety of ways. For example, the wiring 76 may comprise a rigid portion 77 and a flexible portion 78 (both shown diagrammatically). The rigid portion 77 may comprise a number of rigid conductive pins extending from the processing unit 70 through the wiring exit of the lid 68, with the sealed connection established between the pins and the wiring exit. The pins may make a turn upon exit from the lid so as to be L-shaped. The flexible portion 78 may comprises a number of flexible wires attached to the pins. In another example, the rigid portion 77 may be replaced by an extended flexible portion 77.

The wiring 76 is routed along the leg 54 where the wiring 76 is held in place with a number of wiring retainers coupled to the leg 54 (e.g., two clips clipped onto the leg 54). The guard 58 comprises a groove 80 aligned with the leg 54 to receive the wiring 76 in response to deflection of the leg 54 (e.g., if the leg 54 is deflected upwardly and rearwardly by the ground). The groove 80 may thus help protect the wiring 76 upon deflection of the leg 54. The guard 58 comprises a through-hole 82 through which the wiring 76 passes to a point rearward of the guard 58. The wiring 76 passes along the shank 62 into a cavity within the frame 14 to the controller 74. In other embodiments, the processing unit 70 and the controller 74 may be electrically coupled via a wireless connection.

Figure 7:
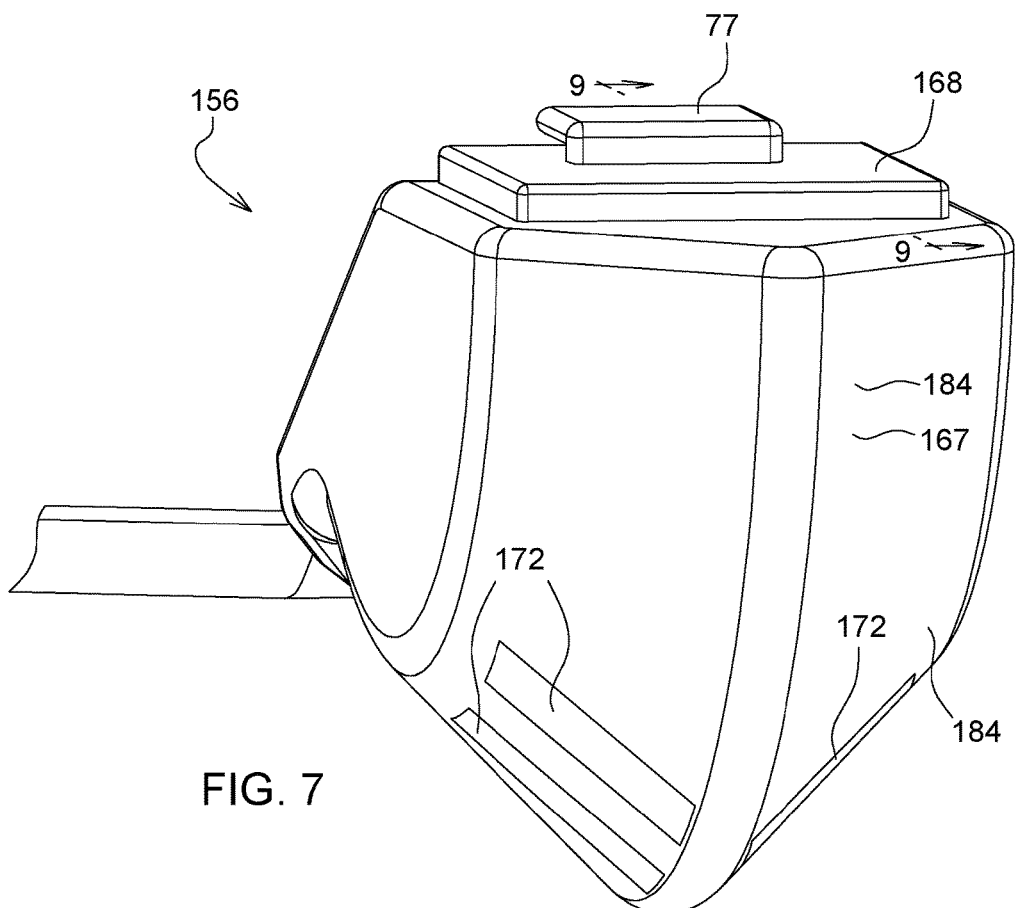
FIG. 7 is a perspective view showing a second embodiment of the foot and sensor.
Figure 8:
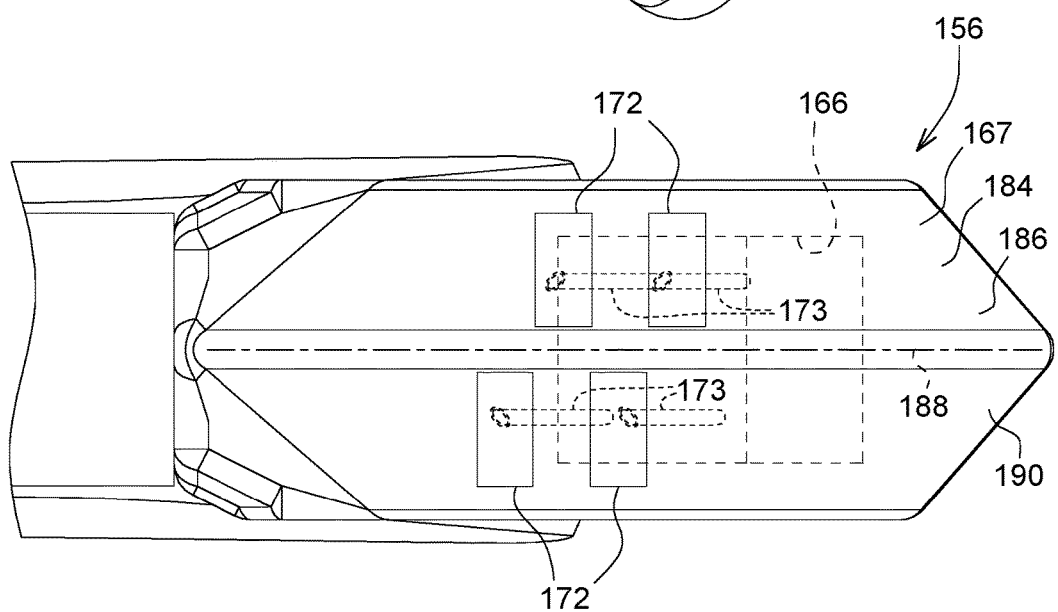
FIG. 8 is a bottom view showing the foot and sensor of FIG. 7.
Figure 9:
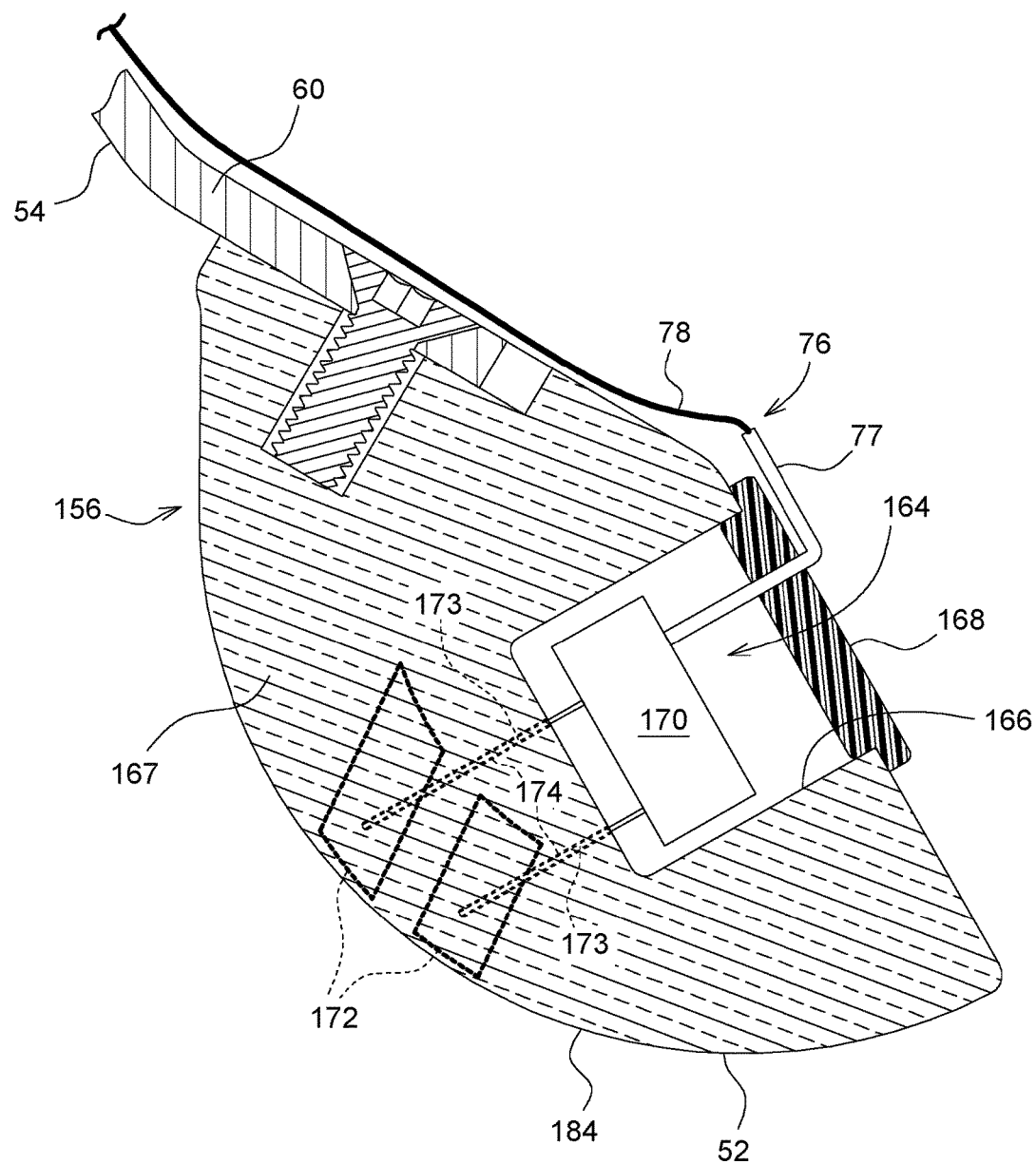
FIG. 9 is a sectional view taken along lines 9-9 of FIG. 7.

Referring to FIGS. 7-9, according to another embodiment, a foot 156 and a sensor 164 (shown diagrammatically) may be used in place of the foot 56 and the sensor 64. As such, although the reference numbers are different in the description of this embodiment, the foot 156 and the sensor 164 are similar in construction and function to the foot 56 and the sensor 64, except as noted herein.

The sensor 164 comprises a processing unit 170 and a number of electrodes 172 electrically coupled to the processing unit 170. The processing unit 70 may be mounted to a circuit board positioned in the cavity 166. The processing unit 170 is positioned and enclosed within the cavity 166 by the foot 156 upon closure of the cavity 66 by the lid 168. The processing unit 170 is embedded in the potting material or other permanent molding material so as to be held in place in the cavity 166.

Illustratively, there are four electrodes 172, but it is to be understood that the number of electrodes 172 may be more or less than four. The electrodes 172 are arranged in a first set of two electrodes 172 positioned on a first side 186 of a centerline 188 of the foot 156, and a second set of two electrodes 172 positioned on an opposite second side 190 of the centerline 188. The centerline 188 is positioned at a vertex of the V shape of the foot 156 and is parallel to the planting direction of travel 12. The first and second sets of electrodes 172 are staggered from one another along the centerline 188 (in other embodiments, they may be even with one another along the centerline 188).

The electrodes 172 are embedded in the foot 156 and positioned outside the cavity 166. The electrodes 172 are integrated into an exterior 184 of the body 167 of the foot 156 for exposure to and contact with soil. The exterior 184 comprises a respective recess for each electrode 172 in which the electrode 172 is positioned and affixed or otherwise mounted (e.g., mechanically retained; adhesive; potting material or other permanent molding material), for protection of the electrode 172 as the electrode 172 is moved through the soil. The electrodes 172 may thus be characterized as external electrodes, while the electrodes 72 may be characterized as internal electrodes.

The body 167 is made, for example, of a wear-resistant material. Since the electrodes 172 are external electrodes, the body 167 need not be made of a non-conductive material (although it can be). The body 67 may be made, for example, of a ceramic material (e.g., a hard ceramic with high wear resistance like Magnesia Stabilized Zirconia material (MSZ)). In other embodiments, the body 67 may be made of ultra-high molecular weight polyethylene (UHMW), or other suitable plastic material.

The electrodes 172 are electrically coupled to the processing unit 170. Each electrode 172 may be electrically coupled to the processing unit 170 by a wired connection, a pin, a wireless connection, or other suitable electrical connection. Illustratively, each electrode 172 is electrically coupled to the processing unit 170 by a pin 173 extending from the electrode 172 to the processing unit 170 through a respective internal conduit 174 formed in the body 167 of the foot 156 and in communication with the cavity 166.

While the present disclosure has been illustrated and described in detail in the drawings and foregoing description, such illustration and description is to be considered as disclosing examples and not restrictive in character. It is to be understood that illustrative embodiments have been shown and described and that all changes and modifications that come within the spirit of the present disclosure are desired to be protected. It will be noted that alternative embodiments of the present disclosure may not include all of the features shown and described. Those of ordinary skill in the art may readily devise their own implementations that incorporate one or more of the features of the present disclosure and fall within the spirit and scope of the appended claims.

What is claimed is:

1. A planter row unit, comprising:
    a frame,
    a furrow opener mounted to the frame to open a furrow;
    a seed delivery mechanism mounted to the frame to deposit seed into the furrow;
    a furrow shaper mounted to the frame and positioned relative to the furrow opener and the seed delivery mechanism to shape the furrow, opened by the furrow opener, ahead of seed deposited into the furrow by the seed delivery mechanism relative to a planting direction of travel of the planter row unit; and
    a sensor mounted to the furrow shaper and configured to detect a parameter related to seed planting.

2. The planter row unit of claim 1, wherein the furrow shaper comprises a foot profiled to shape the furrow, and the sensor is mounted in the foot.

3. The planter row unit of claim 2, wherein the sensor is embedded in the foot.

4. The planter row unit of claim 2, wherein the foot comprises a cavity and a lid closing the cavity.

5. The planter row unit of claim 2 wherein the foot comprises a cavity, and the sensor is enclosed within the cavity by the foot.

6. The planter row unit of claim 5, wherein the sensor comprises an electrode, and the electrode is enclosed within the cavity by the foot.

7. The planter row unit of claim 2, wherein the foot comprises a cavity, and the sensor comprises a processing unit enclosed within the cavity by the foot.

8. The planter row unit of claim 2, wherein the furrow shaper comprises a leg projecting downwardly, and the foot is mounted to an end of the leg.

9. The planter row unit of claim 8, wherein the leg is spring biased downwardly to press the foot against the bottom of the furrow.

10. The planter row unit of claim 8, wherein the leg is a flat spring.

11. The planter row unit of claim 8, comprising wiring routed along the leg, wherein the frame comprises a guard positioned between the furrow shaper and the seed delivery mechanism, and the guard comprises a groove aligned with the leg to receive the wiring in response to deflection of the leg.

12. The planter row unit of claim 1, wherein the furrow shaper is spring biased downwardly to press against the bottom of the furrow.

13. The planter row unit of claim 1, wherein the sensor is a soil sensor.

14. The planter row unit of claim 1, wherein the parameter is soil moisture.

15. The planter row unit of claim 1, wherein the parameter is soil temperature.

16. The planter row unit of claim 1, wherein the parameter is organic matter content.

17. The planter row unit of claim 1, wherein the parameter is residue presence.

18. A mobile agricultural machine, the mobile agricultural machine comprising:

a frame;

a furrow opener coupled to the frame and configured to open a furrow;

a seed delivery mechanism coupled to the frame and configured to deposit seed into the furrow;

a furrow shaper coupled to the frame behind the furrow opener and ahead of the seed delivery mechanism relative to a travel direction of the mobile agricultural machine, the furrow shaper configured to shape the furrow;

a sensor disposed within the furrow shaper and encased by the furrow shaper; and electronics coupled to the sensor and disposed within the furrow shaper, the electronics encased by the furrow shaper.

\* \* \* \* \*